(12) United States Patent  (10) Patent No.: US 6,445,340 B2
Fenton  (45) Date of Patent: Sep. 3, 2002

(54) METHOD AND APPARATUS FOR GENERATING A TIME SIGNAL

(75) Inventor: Patrick C. Fenton, Calgary (CA)

(73) Assignee: NovAtel, Inc., Calgary (CA)

( * ) Notice: Subject to any disclaimer, the term of this patent is extended or adjusted under 35 U.S.C. 154(b) by 0 days.

(21) Appl. No.: 09/770,421

(22) Filed: Jan. 26, 2001

Related U.S. Application Data

(60) Provisional application No. 60/178,116, filed on Jan. 26, 2000.

(51) Int. Cl.⁷ .............................. G01S 5/02; H04B 7/185
(52) U.S. Cl. .............................. 342/357.12; 342/357.06; 701/213
(58) Field of Search ........................ 342/357.05, 357.12, 342/357.06; 701/213

(56) References Cited

U.S. PATENT DOCUMENTS

| | | |
|---|---|---|
| 4,336,542 A | 6/1982 | Bielli et al. |
| 4,445,118 A | 4/1984 | Taylor et al. |
| 4,704,735 A | 11/1987 | Swapp et al. |
| 5,036,523 A | 7/1991 | Briskman |
| H1618 H | 12/1996 | Blume |
| 5,621,646 A | 4/1997 | Enge et al. |
| 5,623,414 A | 4/1997 | Misra |
| 5,731,786 A | 3/1998 | Abraham et al. |
| 5,736,960 A | 4/1998 | Murphy et al. |
| 5,760,738 A | 6/1998 | Kawano |
| 5,952,960 A * | 9/1999 | Lennen ................... 342/357.01 |

* cited by examiner

Primary Examiner—Theodore M. Blum
(74) Attorney, Agent, or Firm—Cesari and McKenna, LLP

(57) ABSTRACT

A time signal generation system produces a reference time signal based on the signals transmitted by geostationary satellites, such as the satellites in the Wide Area Augmentation System (WAAS). A receiver in the system includes a directional antenna that is focused on the signals transmitted by the geostationary satellite. The antenna rejects multipath signals, and the receiver thus tracks the satellite signal directly, without having to compensate for multipath distortion. Once the receiver is tracking the code and carrier, the receiver decodes the transmitted data to recover timing information, as well as satellite orbital correction information and an ionospheric model, or table, transmitted by the satellite. The receiver then uses the decoded information and timing pulses provided in synchronism with the transmitted PRN code to produce a corrected timing signal. The timing signal is provided to drive a reference clock that produces a system time signal that is essentially as stable as the Cesium clock signals utilized by the WAAS system.

24 Claims, 1 Drawing Sheet

METHOD AND APPARATUS FOR GENERATING A TIME SIGNAL

CROSS-REFERENCE TO RELATED APPLICATIONS

This application claims priority from a U.S. Provision Application Ser. No. 60/178,116 filed Jan. 26, 2000, and entitled METHOD AND APPARATUS FOR GENERATING A TIME SIGNAL, and incorporates the provisional application herein in its entirety.

BACKGROUND OF THE INVENTION

1. Field of the Invention

The present invention is related to time signal generators and, more particularly, to a time signal generating system for generating a time signal from a broadcast signal provided by a geostationary navigation satellite.

2. Background Information

For various systems, such as triangulation systems or communications systems, it is desirable provide a time reference signal, such that the stations in the system are all operating in accordance with the same underlying time. In a triangulation system, for example, the stations must operate using the same time reference so that the position information from various stations can be combined to pinpoint the location of a transmitter.

Various mechanisms for producing time signals are known however, the mechanisms are relatively complex. In a GPS system, for example, a GPS receiver can determine a reference time using information transmitted by the GPS satellites. To obtain accurate timing information from the GPS satellite signals, however, the GPS receivers must compensate for multipath signals, doppler shifts, ionospheric delays, signal jamming, and so forth. Accordingly, the GPS receivers are relatively complex and often process both the L1 and L2 signals transmitted by the GPS satellites to determine accurate ionospheric delay information.

SUMMARY OF THE INVENTION

The invention is a time signal generation system that produces a reference time signal based on the signals transmitted by geostationary satellites, such as the satellites in the Wide Area Augmentation System (WAAS). A receiver in the system includes a directional antenna that is focused on the signals transmitted by the geostationary satellite. The antenna rejects multipath signals, and the receiver can thus track the satellite signal directly, without compensating for multipath distortion. Once the receiver is tracking the code and carrier, the receiver decodes the transmitted data to recover timing information, as well as satellite orbital correction information and an ionospheric model, or table, transmitted by the satellite. The receiver then uses the information to produce a corrected timing signal that drives a reference clock. In response, the reference clock produces a system time signal that is essentially as stable as the Cesium clock signals utilized by the WAAS system.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
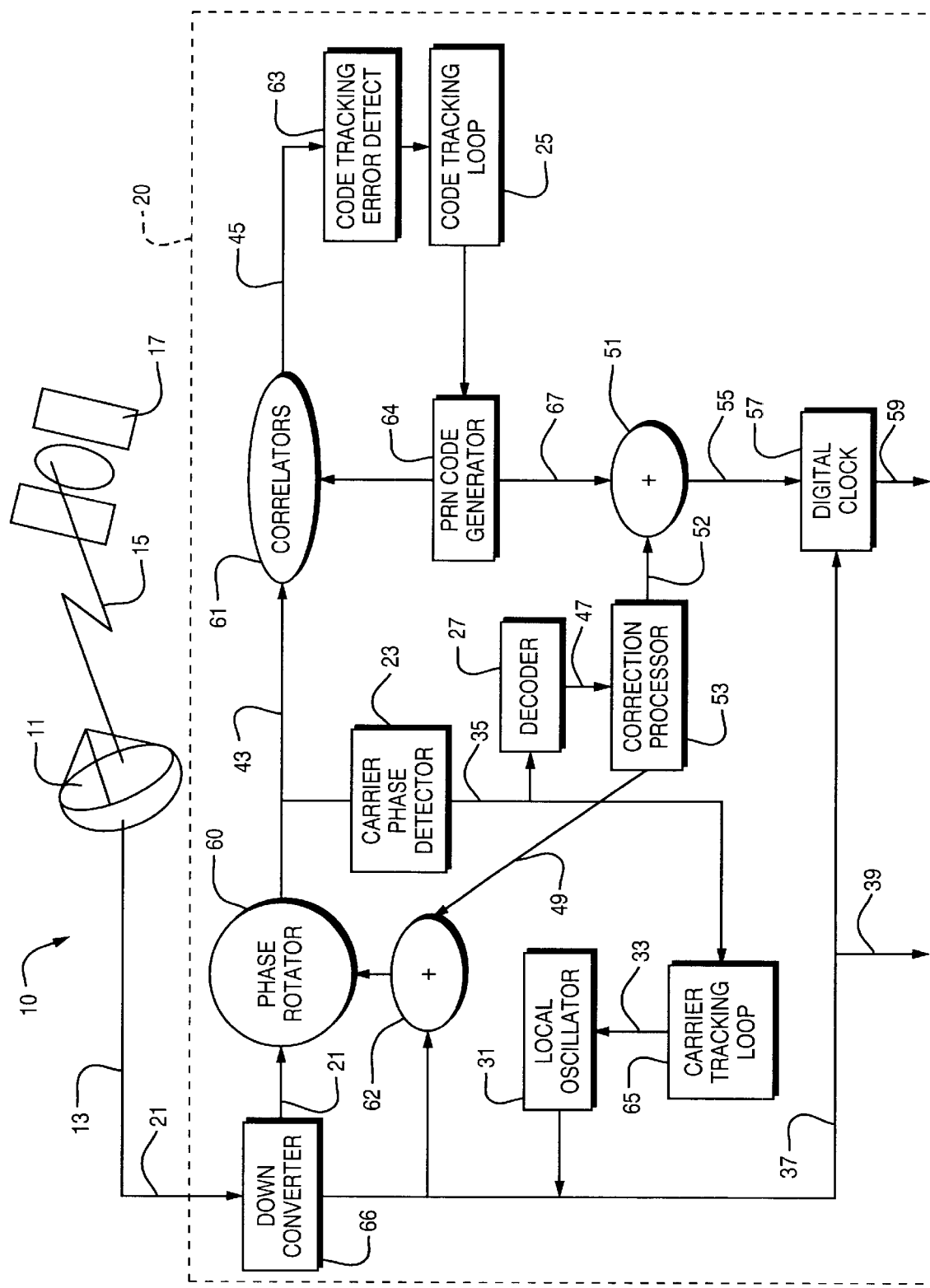
FIG. 1 is a time signal generating system constructed in accordance with the invention.

There is shown in FIG. 1 a time signal generating system 10, in accordance with the present invention. The system comprises a directional receiving antenna 11 and a receiver 20. The receiver may be a single-channel receiver or a single channel of a GPS receiver (not shown). The system 10 utilizes a time standard signal 15 emitted by a geostationary navigation satellite 17, such as the Wide Area Augmentation System (WAAS) satellite, which broadcasts the signal at 1575.42 MHz, i.e., in the L1 band.

The time standard signal 15 is acquired by the receiving antenna 11, which may be a stationary parabolic dish, a feed horn antenna or a geodetic choke ring antenna, or the like. The antenna 11 is focused to receive signals transmitted by the geostationary satellite and reject multipath signals. The antenna thus provides to the receiver a received signal 13 that is essentially free of multipath distortion and has a relatively high signal to noise ratio.

The receiver 20 processes the received signal 13 to track a carrier and PRN code contained therein and recover data from the signal. The receiver includes a downconverter 66 that downconverts the received signal to a desired frequency. The downconverter supplies the downconverted signal on line 21 to a phase rotator 60 that rotates the signal to remove the effects of doppler, as discussed in more detail below. The downconverted signal is applied to a carrier phase detector 23 and correlators 61.

The correlators 61 operate in a known manner to synchronize a PRN code in the received signal with the PRN code generated by a PRN code generator 64. The correlators thus multiply the received PRN code by the locally-generated PRN code to produce correlation values that are supplied on line 45 to a code tracking error detector 63. The code tracking error detector determines, from the correlator values, how well the locally generated PRN code is aligned with the received PRN code. The code tracking error detector then provides a signal that controls the PRN code generator. In response, the PRN code generator phase shifts the local PRN code.

The PRN code generator 64 supplies timing information on line 67 to a summation processor 51. Once the locally generated PRN code is in alignment with the received code, the PRN code generator produces pulses that are synchronous with the code epochs in the received PRN code. The PRN code generator thus supplies a pulse every twenty milliseconds. Alternatively, or in addition, the PRN code generator supplies a pulse that is synchronous with the bit edges in the PRN code.

A carrier tracking loop 65 detects if a locally-generated carrier that is associated with the local oscillator 31 is aligned with a carrier in the received signal. The carrier tracking loop produces on line 33 an error signal that controls the phase and frequency of the local oscillator 31. A carrier phase detector 23 determines the phase of the carrier in the received signal and provides the phase information to a decoder 27. The decoder 27 then uses the phase information to decode bi-phase modulated data that is included in the received signal. The decoder 27 decodes the data to provide to a correction processor 53 information relating to the position and velocity of the satellite 17, as well as an ionospheric delay model, or table, and time of day information.

The correction processor 53 calculates a doppler correction value based on the decoded satellite velocity information and provides the value to a summation processor 62. The doppler correction value corrects for the slight movement of the satellite 17 relative to the antenna 11. The correction processor also provides to a summation processor 51 a correction signal on line 52. The summation processor combines the correction signal with the timing signal produced by the PRN code generator, to compensate for the ionospheric, tropospheric and propagation delays.

The correction processor determines the ionospheric delay by entering the table transmitted by the satellite and, as necessary, interpolating the table values based on the relative positions of the antenna and the satellite. The processor similarly enters a stored table to determine a value to compensate for tropospheric delay.

The correction processor determines the propagation delay as a combination of a previously measured, or predetermined, delay value that corresponds to the time the signal takes to travel through the receiver circuitry and a transit time delay value that corresponds to the time it takes the signal to travel from the satellite to the receiver. The transit time is based on the known position of the geostationary navigation satellite 17, as corrected by the orbital information included in the received signal, and the calculated or known position of the receiver. The receiver determines its own position based on information provided by a user or, as appropriate, from position measurements made by an associated GPS receiver (not shown). The receiver then calculates the transit time in a known manner based on the relative positions of the satellite and the receiver.

The summation circuit 51 corrects the timing of the pulses provided by the PRN code generator for the various delays and provides a corrected timing signal 55 to control a digital clock 57. The digital clock is also provided with a signal from the local oscillator 31 that is synchronous with the frequency of the Cesium time produced for the WAAS network. This signal ensures that the reference time signal produced by the clock does not drift. The digital clock, in turn, produces a stable one pulse per second signal on line 59. The signal 37 may also be provided as a frequency standard on line 39.

The local oscillator 31 may instead be phase-locked with an oscillator that drives a user's local clock. The receiver in such an arrangement determines a frequency shift for the local clock, to bring that clock into alignment with the Cesium-based clock used in the WAAS system.

The receiver may also provide the time of day to the user and/or display the time of day. The time of day information is decoded from the received signal 13 and corrected, as necessary, by the correction processor.

The receiver may also calculate a relative ionospheric delay from the received code and carrier rather than a transmitted table. The satellite 17 transmits the code and carrier in synchronism. However, the ionosphere shifts the transmitted code in one direction and the carrier signal in an opposite direction. By tracking the difference between the carrier shift and the code shift (i.e., $\Delta_{code} - \Delta_{carrier}$) in the received signal, the receiver can thus determine the relative ionospheric delay.

Further details of the operations of the receiver in tracking the carrier and code in the satellite can be found in U.S. Pat. No. 5,101,416, which is incorporated herein in its entirety by reference.

The receiver 20 uses relatively inexpensive circuitry to generate a system time standard signal that is comparable to the timing signals produced by a Cesium clock that generates the timing signals for the WAAS system. The receiver uses the directional antenna, and thus, need not include circuitry for removing or compensating for the adverse affects of multipath signals in code and carrier tracking. The use of the directional antenna, and in particular the feed horn and dish antennas discussed above, also makes the system relatively immune to local radio frequency interference or jamming. The dish or feed horn antennas have narrow apertures and, therefore, a radio source would have to be with the "beam" of the antenna for the signals from the source to interfere with the reception of satellite signals. Accordingly, the receiver need not include circuitry that manipulates the received signal to overcome the adverse effects of jamming. Further, the receiver can use delay and satellite position information in the received signal to correct transmitted timing information, without having to calculate correction information based on the decoding of signals transmitted over multiple frequency bands, i.e., the L1 and L2 bands, used by GPS receivers.

What is claimed is:

1. A system for producing a system time signal, the system including:
    A. a directional antenna that is focused to receive signals transmitted by a geostationary satellite; and
    B. a receiver that processes the signal received by the antenna, the receiver including
        i. code and carrier tracking circuits for tracking a carrier and a PRN code included in the signals received by the antenna;
        ii. a decoder for decoding timing information, satellite position information and ionospheric delay information from the signals received by the antenna; and
        iii. a correction subsystem for producing a corrected timing signal that is based on the transmitted signal and corrected for associated propagation and atmospheric delays, and
        iv. a reference clock for producing a system time signal that is associated with the corrected timing signal.

2. The system to claim 1 wherein the receiver determines its position based on information provided by a user.

3. The system of claim 1 wherein the receiver further includes circuitry for processing signals transmitted by global position satellites, and the receiver determines its position based on measurements associated with the signals transmitted by the global position satellites.

4. The system of claim 1 wherein the antenna is a parabolic dish antenna.

5. The system of claim 1 wherein the antenna is a feed horn antenna.

6. The system of claim 1 wherein the antenna is a geodetic choke ring antenna.

7. The system of claim 1 wherein the atmospheric delays are ionospheric and tropospheric delays.

8. The system of claim 7 wherein the correction subsystem determines ionospheric delay using a table transmitted by the geostationary satellite and tropospheric delay using a stored table.

9. The system of claim 8 wherein the correction subsystem determines propagation delay based on satellite position information transmitted by the satellite and a known position of the receiver.

10. The system of claim 8 wherein the correction subsystem determines propagation delay based on satellite position information transmitted by the satellite and receiver position information determined by a global position system receiver.

11. The system of claim 1 wherein the correction subsystem includes
    a. a PRN code generator that provides a timing signal that includes pulses that are synchronous with PRN code epochs,
    b. a correction processor that provides correction signals to compensate for delays, and c. a summation processor that combines the timing signal and the correction signals to produce a corrected timing signal.

12. The system of claim 11 wherein i. the receiver further includes a phase rotator for rotating the phase of a received signal, and ii. the correction subsystem provides a control signal to the phase rotator to control for doppler effects of satellite movement relative to the antenna.

13. The system of claim 12 wherein the correction processor determines the doppler effects based on satellite velocity information transmitted by the satellite.

14. The system of claim 11 wherein the PRN code generator further includes in the timing signal pulses that are synchronous with PRN code bits.

15. The system of claim 1 further including a display for displaying the time.

16. The system of claim 1 further producing a correction signal for an associated local clock, the correction signal providing phase shift information relating to a phase shift required to phase-lock the local clock to a time signal transmitted by the satellite.

17. The system of claim 11 wherein the directional antenna is a parabolic dish antenna.

18. The system of claim 11 wherein the directional antenna is a feed horn antenna.

19. The system of claim 11 wherein the antenna is a geodetic choke ring antenna.

20. A system for producing a system time signal, the system including:

C. a directional antenna that is focused to receive signals transmitted by a geostationary satellite; and D. a receiver that processes the signal received by the antenna, the receiver including i. code and carrier tracking circuits for tracking a carrier and a PRN code included in the signals received by the antenna;

ii. a decoder for decoding timing information, satellite position and velocity information from the signals received by the antenna; and iii. a correction subsystem for determining associated ionospheric, tropospheric and propagation delays and producing a corrected timing signal that is based on the transmitted signal that is based on the transmitted signal and corrected for the delays, and iv. a reference clock for producing a system time signal that is associated with the corrected timing signal.

21. The system of claim 20 wherein the antenna is a parabolic dish antenna.

22. The system of claim 20 wherein the antenna is a feed horn antenna.

23. The system of claim 20 wherein the antenna is a geodetic choke ring antenna.

24. The system of claim 20 wherein the correction processor corrects for doppler by phase rotating the received signal.

* * * * *